(Model.)

I. FARNSWORTH.
Marine Clocks.

No. 234,863. Patented Nov. 30, 1880.

Witnesses,
W. J. Cambridge
Chas. E. Griffin

Inventor,
Ira Farnsworth
per H. Teschemacher
Atty.

N. PETERS, PHOTO-LITHOGRAPHER, WASHINGTON, D.C.

UNITED STATES PATENT OFFICE.

IRA FARNSWORTH, OF BOSTON, MASSACHUSETTS.

MARINE-CLOCK.

SPECIFICATION forming part of Letters Patent No. 234,863, dated November 30, 1880.

Application filed September 22, 1880. (Model.)

*To all whom it may concern:*

Be it known that I, IRA FARNSWORTH, a citizen of the United States, residing at Boston, in the county of Suffolk and State of Massachusetts, have invented certain Improvements in Marine-Clocks, of which the following is a full, clear, and exact description, reference being had to the accompanying drawings, making part of this specification, in which—

Figure 1:
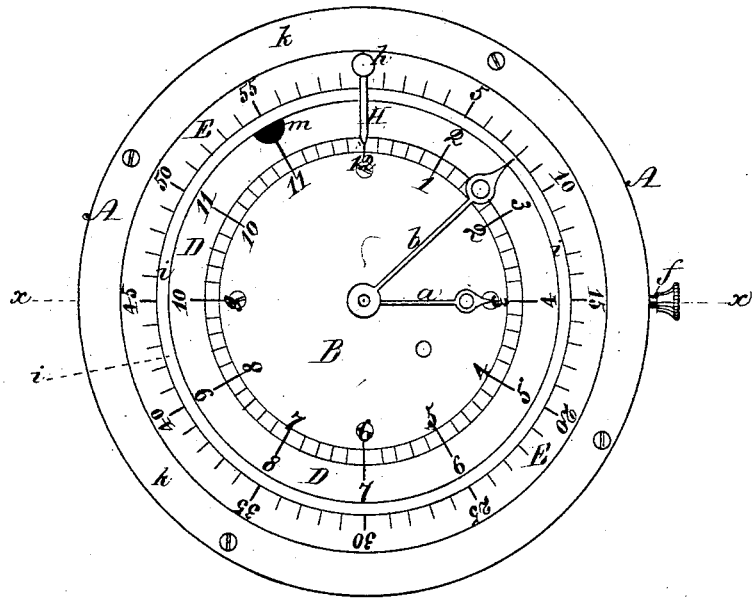
Figure 2:
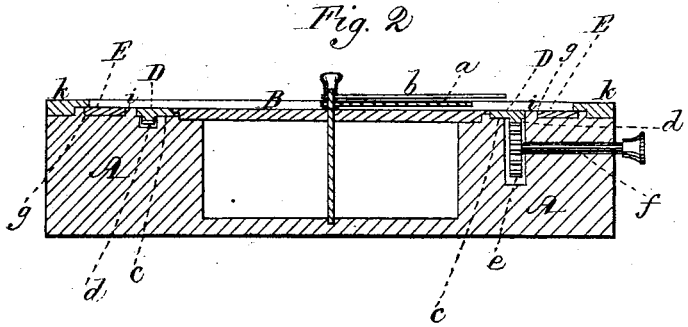

Figure 1 is a plan of a marine-clock having my improvements applied thereto. Fig. 2 is a vertical section on the line $x\ x$ of Fig. 1, the movement being removed from the case.

My invention consists in a marine-clock having its dial surrounded by one or more graduated rings capable of being moved by hand independently of each other, to enable them to be set in any desired position, the ring or rings being so arranged and combined with a pointer that the length of time which the vessel has run on a certain course may be accurately determined at a glance, whereby the necessity of setting down the time of departure whenever the course of the vessel is changed, as heretofore required when an ordinary clock is used, is avoided, together with the great amount of calculation and figuring incident to this method of keeping the reckoning.

In the said drawings, A represents the outer case of a marine-clock, which is provided with an ordinary stationary dial, B, and hour and minute hands $a\ b$, the movement, which may be of any suitable description, not being shown.

Around the periphery of the dial B and concentric therewith is placed, in an annular groove, $c$, a ring, D, which is provided on its under side with teeth $d$, with which engages a gear or pinion, $e$, secured to the inner end of a shaft, $f$, extending outside the case A into a convenient position to be turned by the hand to effect the revolution of the ring D, which is graduated or divided into twelve equal spaces, representing the hours, each division bearing its distinguishing number or mark. Outside the ring D, within an annular groove, $g$, is placed a second concentric ring, E, which is capable of being freely rotated in its groove, by hand, independently of the ring D, by taking hold of a knob or projection, $h$, secured thereto. The ring E is separated from the ring D by a dividing-flange, $i$, and is held in place by a stationary ring, $k$, which is secured to the case A and overlaps the outer edge of the ring E, as seen in Fig. 2, this ring E being graduated or divided into sixty equal spaces, representing minutes, every fifth mark bearing its appropriate number.

H is a pointer, which is permanently attached to the outer revolving ring, E, at the line representing "sixty."

In foggy weather, or at any other time when the vessel is running by the clock, its operation is as follows: On taking a departure the outer ring, E, is rotated until its pointer H is immediately beneath or opposite to the minute-hand $b$, in which position it is left, and thus as the hand $b$ moves onward around the graduations of the ring E it will always indicate thereon the exact number of minutes that have elapsed since the departure was taken. As soon as the vessel has run the desired number of minutes in a given direction the course is changed, and the ring E at the same time moved so as to again bring the pointer H opposite to the minute-hand, as before, when the number of minutes run on the second course will be indicated on the ring, as before, and so on, the position of the pointer H being changed with each new course run; and it will thus be seen that a single glance at the clock will always be sufficient to instantly determine the time run on each course, which greatly lessens the labors of the pilot and enables him to pay closer attention to his duties and keep a better lookout, for the reason that he is not required to set down upon a slate the exact time of each departure and make complex calculations therefrom, as heretofore, no figuring whatever being required where my improved clock is employed, and consequently great accuracy is insured, which, in foggy weather, is of the utmost importance, and the liability of accidents resulting from errors or miscalculations in a great measure avoided.

When the vessel is to be run upon a single course for more than one hour the inner ring, D, is employed in the following manner: On taking the departure the ring D is rotated by turning the shaft $f$ until the dark spot $m$, representing the figure 12, is brought opposite to the outer end of the hour-hand $a$, and the ring E is also moved, as usual, to bring the pointer H opposite to the end of the minute-hand $b$. The number of hours run on the course is then indicated on the ring D by the hour-hand $a$, while the number of minutes in addition to each hour is indicated, as usual, on the ring E by the minute-hand $b$, as before described.

If desired, the rings may be of different colors, so as to enable them to be more readily distinguished from each other.

It is evident that the inner ring, D, could be dispensed with; but in such case some figuring would be required when the vessel was run on a single course for more than one hour, and I therefore prefer to use both of the rings D E, as above described.

Instead of rotating the ring D by gearing, as shown and described, it may be moved by means of a knob or projection, or by any other suitable device.

What I claim as my invention, and desire to secure by Letters Patent, is—

1. In a marine-clock, the combination, with the stationary dial B and the hour and minute hands $a\ b$, of the concentric graduated ring E, provided with a pointer, H, adapted to be moved with the ring around the dial, by hand, and set so that the hand $b$ will indicate upon the ring the number of minutes which the vessel has run on a single course, substantially as described.

2. In a marine-clock, the combination, with the stationary dial B and the hands $a\ b$, of the concentric graduated ring D, adapted to be moved by hand around the dial, and set so that the hand $a$ will indicate upon the ring the number of hours which the vessel has run on a single course, substantially as set forth.

3. In a marine-clock, the combination, with the stationary dial B and the hands $a\ b$, of the pointer H and the concentric graduated rings D E, capable of being rotated around the dial independently of each other, all constructed to operate substantially in the manner and for the purpose described.

Witness my hand this 13th day of September, A. D. 1880.

IRA FARNSWORTH.

In presence of—
P. E. TESCHEMACHER,
CHAS. E. GRIFFIN.